S. MICHAUD.
WHEEL.
APPLICATION FILED MAY 11, 1915.
1,171,225.
Patented Feb. 8, 1916.
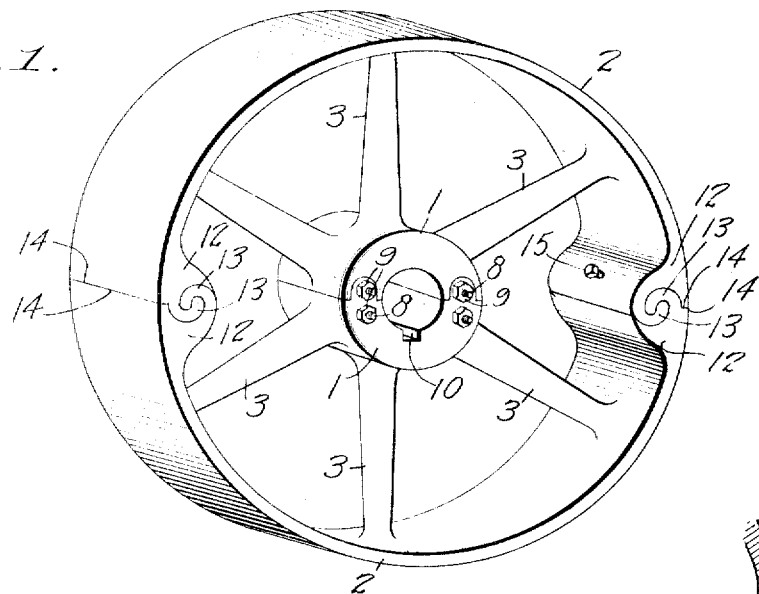
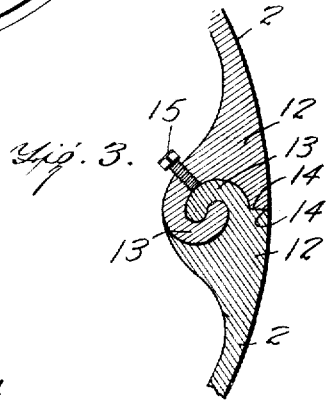
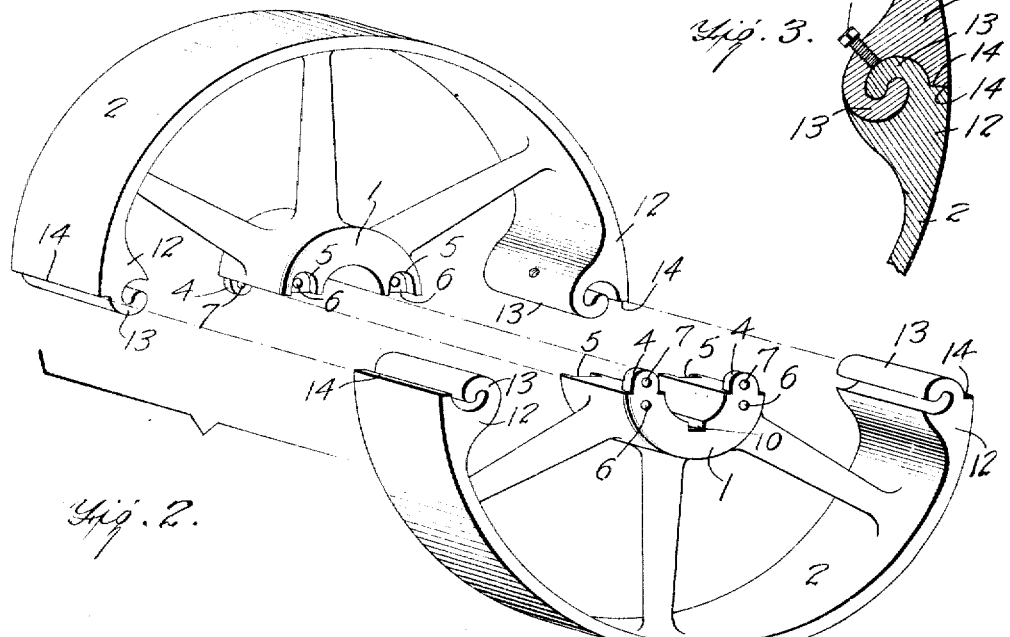
WITNESSES:
L. H. Schmidt
N. E. Beck
INVENTOR
SAMUEL MICHAUD,
BY Munn & Co
ATTORNEYS

UNITED STATES PATENT OFFICE.

SAMUEL MICHAUD, OF SALTESE, MONTANA.

WHEEL.

1,171,225.

Specification of Letters Patent. Patented Feb. 8, 1916.

Application filed May 11, 1915. Serial No. 27,377.

*To all whom it may concern:*

Be it known that I, SAMUEL MICHAUD, a citizen of the United States, and a resident of Saltese, in the county of Mineral and State of Montana, have invented a new and useful Improvement in Wheels, of which the following is a specification.

My invention is an improvement in wheels, and the invention has for its object to provide a wheel of the pulley type, wherein the wheel comprises a hub, a rim, and spokes connecting the hub and the rim, and is composed of sections, the hub portions of the sections having interlocking mechanism for preventing movement of the portions longitudinally of the axis of the wheel, and the rim sections having interlocking mechanism for preventing circumferential displacement of the sections with respect to each other.

In the drawing: Figure 1 is a perspective view of the improved wheel in condition for use. Fig. 2 is a similar view with the parts separated, and Fig. 3 is an enlarged section through the interlocking mechanism of the rim portion.

In the present embodiment of the invention the wheel consists of a hub and a rim connected by spokes, and the wheel is composed of sections, each section having a hub portion 1, a rim portion 2 and spokes 3 connecting the hub and rim, the relative dimensions of the parts depending upon the conditions under which the wheel is to be used. The hub portion of each section is provided at one end and at opposite sides of the center with perforated lugs 4, and at the other end each hub portion has notches or recesses 5 shaped to fit and receive the tongues 4 of the hub portion of the other section. The tongues and recesses of the sections are oppositely arranged and each hub portion is provided with openings 6 extending longitudinally of the hub at the inner sides of the tongues and at the notches or recesses 5.

When the hub portions of the sections are fitted together the openings 6 of each portion will register with the perforations 7 of the lugs of the other hub portion. Bolts 8 are passed through the openings 6 of each hub portion and through the registering openings 7 of the tongues of the other hub portion, and each bolt is engaged by a nut 9 at the opposite end of the hub from the head of the bolt. Thus the hub portions of the sections are interlocked to prevent movement away from each other perpendicular or longitudinal of the hub. The hub portion of one section is provided with an internal key-way 10 for receiving a key to lock the wheel against angular movement on a shaft, and a set screw 11 is also provided extending through the hub portion into engagement with the shaft, when the wheel is thereon, to prevent longitudinal movement of the wheel on the shaft.

The rim portion of each section of the wheel is enlarged at its end internally to form a species of head 12, and at each end form the rim portion has a species of largement 13, extending the full width of the rim hook 13, extending the full width of the rim portion. The hooks are so shaped, that they will fit closely the hook at the adjacent end of the rim portion of the other section, and will interlock therewith, as shown in Figs. 1 and 3. Outside of the hook each of the heads has a plane portion 14 radial to the wheel, and in the same plane with the plane 14 at the opposite end of the portion, and the plane portions of the two sections fit smoothly against each other, as shown in Fig. 3.

It will be noticed from an inspection of the drawing that the hooks of the sections are oppositely arranged, the hooks of one section having their convex surfaces outward, while the hooks of the other sections have their convex surfaces inward. The inner surface of the heads and hooks is such that when the hooks are interlocked, as shown in Figs. 1 and 3, there will be merely a rounded enlargement forced by the abutting heads 12 of the rim portions.

A set screw 15 is passed through each hook 13 of that section whose hooks have their convex surfaces inward, and each set screw extends through the hook at the body thereof, into engagement with the bill of the hook of the other section.

The great difficulty in making sectional wheels is to provide against the rending stress of centrifugal motion of the wheel when in rotation. This is especially true in electrical machines wherein the speed is high. With the interlocking hooks of the rim there is no possibility of disengagement of the sections during the running of the wheel. It will be noticed that the hooks 13 which extend the full width of the rim, are of the same thickness as the rim of the wheel, so that the rim portions may be considered as interlocking with the hooks at their ends. There is nothing to work loose, for even should the set screws 15 be disengaged the resistance to rending stress is not lessened. The set screws 15 are merely to prevent movement of the hooks longitudinally of the axis of the wheel. The engagement between the tongues 4 and the notches or recesses 5 assists the set screws in preventing movement of the sections in the said manner, and the bolts and nuts 8 and 9 also coöperate for this purpose. The hub sections are strongly interlocked by the tongue-and-notch arrangement and the bolts, and the rim sections are also strongly interlocked by the interengaging hooks. In addition, the wheel presents a perfectly smooth plain surface externally, and a smooth surface internally, the only projection being the set screw 15. The improved wheel will wear a belt no more than the ordinary integral wheel.

I claim:

A sectional wheel having a hub and a rim connected therewith, the rim at each end of each section having an enlargement or head on the inner surface of the rim, each enlargement having a hook extending beyond the end of the section, and each enlargement being recessed to receive the adjacent hook of the other section and to form an abutment against which the hook may bear, the hooks fitting and filling each other and the recesses, and extending circumferentially of the rim, and being of substantially uniform cross sectional area throughout their extent.

SAMUEL MICHAUD.

Witnesses:
FRANK J. LUEDKE,
CHAS. P. LUEDKE.

Copies of this patent may be obtained for five cents each, by addressing the "Commissioner of Patents, Washington, D. C."